UNITED STATES PATENT OFFICE.

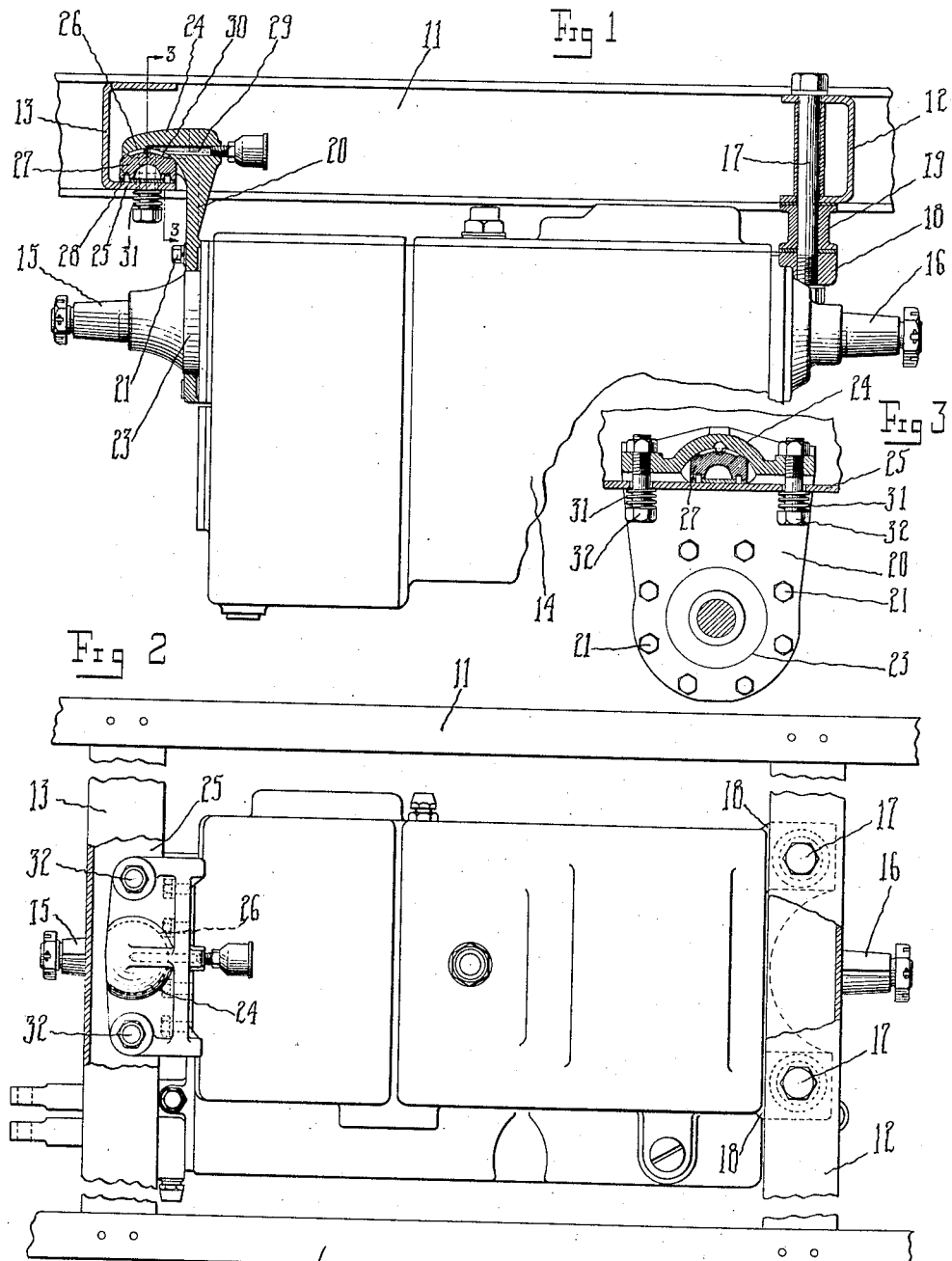

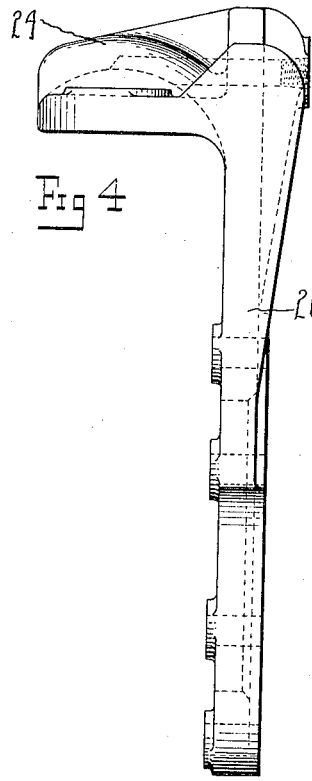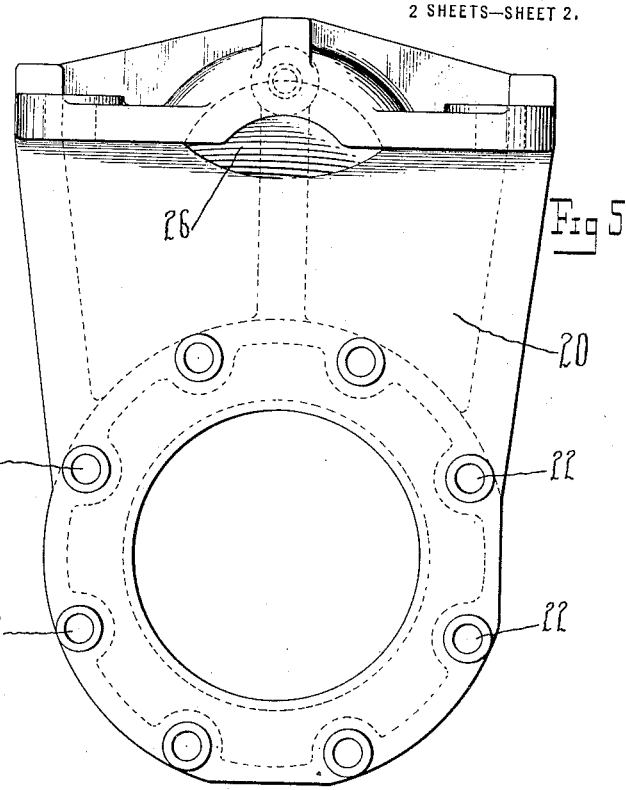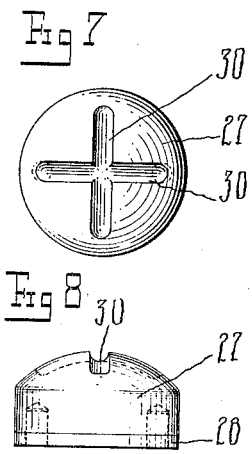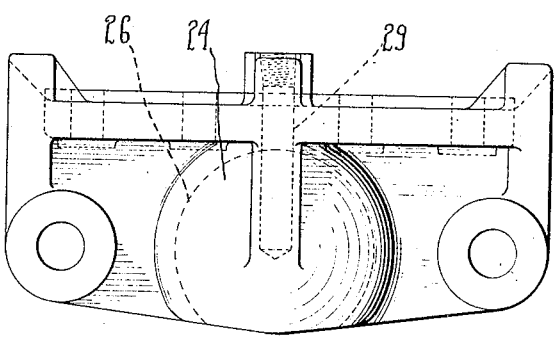

FRANK A. WHITTEN, OF DETROIT, MICHIGAN, ASSIGNOR TO GENERAL MOTORS CORPORATION, OF DETROIT, MICHIGAN, A CORPORATION OF DELAWARE.

SUPPORTING MECHANISM FOR GEAR CASINGS.

1,406,316.  Specification of Letters Patent.  Patented Feb. 14, 1922.

Application filed March 20, 1920. Serial No. 367,322.

*To all whom it may concern:*

Be it known that I, FRANK A. WHITTEN, a citizen of the United States, and a resident of Detroit, county of Wayne, and State of Michigan, have invented certain new and useful Improvements in Supporting Mechanism for Gear Casings, of which the following is a full, clear, concise, and exact description, such as will enable others skilled in the art to which the invention relates to make and use the same, reference being made therein to the accompanying drawings, which form a part of this specification.

My invention relates to automobiles, motor driven trucks and similar self-propelled vehicles, and particularly to means for suspending the change speed gear casing within which the change speed gears commonly present in the power transmission systems of such vehicles are contained beneath and from the frame structure of the vehicle; although my invention is in fact capable of more general use and may be employed to support the clutch or other casing, the engine, or other part of the vehicle beneath and from the frame structure thereof.

The principal object of my invention is to provide a supporting device or mechanism whereby and through which the transmission gearing or other casing of the power plant of a motor driven vehicle is supported from the frame thereof in such a way as to prevent the transmission of strains to the said casing, due to twisting of the frame produced by roughness of the roadway along which the vehicle is driven; thus avoiding the straining and often the breaking of the casing so supported due to twisting or other movement of the frame structure, and maintaining the proper relative position and the permanent alignment of the elements supported within the casing so supported.

A further object of my invention is to provide supporting mechanism of the class described and for the purpose stated which will be simple in construction, and easy to manufacture; and which will permit the transmission gearing or other casing to be more readily assembled with the frame, and more readily disassembled if and when it becomes necessary to do so, than has heretofore commonly been the case; and which at the same time will support the casing with which it is used securely in place and in proper position relative to the various other elements and parts of the power plant of the vehicle, particularly with reference to the driving shaft and driven or propeller shaft of the transmission mechanism regarded in its entirety.

With the above and other objects of invention in view my invention consists in the improved casing suspension means, mechanism or device illustrated in the accompanying drawings and hereinafter described and claimed; and in such variations and modifications thereof, within the scope of the concluding claims, as will be obvious to those skilled in the art to which my invention relates.

In the drawings accompanying and forming a part of this specification and wherein the preferred embodment of my invention is illustrated:

Figure 1 is a view showing a transmission gearing casing in side elevation and supported beneath the frame of a motor vehicle by suspension mechanism made in accordance with my invention, certain of the parts being shown in section to better disclose their construction and operation.

Figure 2 is a similar view showing the elements shown in Figure 1 in plan.

Figure 3 is a fragmentary view showing a section upon a vertical plane indicated by the line 3—3, Figure 1.

Figure 4 is a view showing the supporting bracket of my improved suspension device by itself, and in side elevation and upon an enlarged scale.

Figure 5 is a view showing the said supporting bracket in end elevation, and as seen from a position to the rear thereof or the right-hand end of Figures 1 and 2.

Figure 6 is a view showing said supporting bracket in plan.

Figure 7 is a view showing the bearing member of my improved suspension mechanism by itself, and in plan.

Figure 8 is a view showing said bearing member in side elevation.

Referring now to the drawings, the reference numerals 10, 11 designate two longitudinally extending and oppositely located side frame members of an ordinary and conventional form of motor vehicle frame, the said frame members being commonly channel-shaped in cross-section in accordance with the usual practice in making the frames of motor driven vehicles although the particular form, construction and arrangement of the parts of the frame is of secondary importance so far as this present invention is concerned and may be varied within wide limits, as my improved suspension device is capable of use in connection with frame members of any style, type or construction. The particular vehicle frame herein illustrated and described is provided with transversly extending supporting members 12, 13 spaced apart from one another, and the ends of which are secured to the side frame members 10, 11.

The reference numeral 14 designates a transmission gearing casing within which the usual change speed gears employed for varying the speed at which the vehicle is driven are located, but which gears are not shown as the details relating thereto are in no way involved in this present invention. In the transmission gearing illustrated the shaft 15 is the driving shaft to which rotary motion is communicated from the engine through the usual clutch mechanism, while the shaft 16 is the driven shaft which is operatively connected with the front end of the driving or propeller shaft as through a suitable universal joint, and through which propeller shaft the rear wheels of the vehicle are driven.

In the embodiment of my invention illustrated the rear end of the transmission gearing casing 14 is fixedly secured relative to the frame of the vehicle as by means of bolts 17 extending through holes provided in the rearmost transverse supporting member 12 and through holes provided in lugs 18 formed adjacent the upper and rear end of the casing in question, the casing being spaced properly from the transverse supporting member by means of spacing members 19 interposed between the parts and through which the bolts 17 extend.

Located at the front end of the transmission gearing casing 14 and extending upwardly therefrom is a supporting bracket 20, which bracket is fixedly secured to the said front end as by means of cap screws 21 extending through holes 22 provided in a flange at the lower end of the said bracket; and which flange is provided with a central opening through which a neck 23 formed upon the front end of the gear casing extends, to thereby provide a stronger support to the casing. This supporting bracket extends upwardly from the casing, as clearly shown in Figure 1, and the upper end 24 thereof is off-set and lies above a horizontally disposed supporting ledge 25 fixedly supported from the frame of the vehicle and which ledge, in the embodiment of my invention illustrated, is provided by and takes the form of the lowermost flange of the forward transversly extending supporting member 13.

The under side of the off-set upper end 24 of the supporting bracket is provided with a concave bearing surface or seat 26; and the reference numeral 27 designates a bearing member the upper side or end of which is convex and of such a curvature as to conform with the surface of the concave bearing seat 26, while the under side or lower end of said bearing member is flat and rests upon the flat upper surface of the supporting member or ledge 25 through which the forward end of the casing is supported from the vehicle frame. A suitable washer 28 is preferably provided between the lower end of the bearing member 27 and the surface from which it is supported, and the upper end 24 of the bracket is shown as provided with a passage 29 through which a lubricating material may be supplied to oil grooves 30 provided in the upper convex surface of the bearing member 27 to thereby provide a proper lubrication for the bearing surfaces between the several elements through which the forward end of the gear casing is supported from the frame.

It will be appreciated that the spherical bearing between the upper side of the bearing member and the seat in the under side of the offset upper end of the bracket permits universal movement of the upper end of the bracket relative to the bearing member while the said bearing member is free to slide sidewise upon the surface of the supporting ledge upon which it rests as well as to move in a fore and aft direction upon said ledge in order that its upper end may find a proper seat in the concave seat. It therefore follows that a universally rocking as well as also a transversely slidable bearing is provided between the upper end of the supporting bracket 20 and the stationary ledge 25 of the frame from which the forward end of the casing is supported, thus providing a construction in which the front end of the gearing casing is free to move in every possible direction and a suspension for the said front end of such a character that the casing will not be subjected to strains, due to the distortion or twisting of the frame of the vehicle, as the vehicle is driven on a rough or uneven roadway. The rear end of the casing is fixedly secured to and partakes of such movement of the transverse supporting member 12 as may be produced by distortion of the frame, but such movements will not subject the casing to strain; as the rocking and transversely slidable bearing provided between the supporting member 20 at the front end thereof and the vehicle frame permits said forward end to move sidewise, and in fact in every possible direction, without in any way subjecting the casing to strains, which strains are therefore compensated for and avoided by such rocking, sliding, or other movement.

The upper end 24 of the supporting bracket 20 is acted upon by spring mechanism which acts to force said upper end downward, to thereby yieldably hold the said bracket in permanent and firm engagement with the bearing member 27. In the form of my invention illustrated this holding mechanism is in the form of two springs 31 which surround the lower ends of two bolts 32 located one upon each side of the bearing member 27, and which bolts extend upward and through holes provided in the flange 25 and through holes in the said offset upper end. The holes in the flange 25 are enlarged and elongated to thereby permit the transversely sliding and other movements of the bearing member 27 above referred to, due to distortion of the frame; and the springs in question act between fixed abutments upon the bolts and the under side of said flange to draw the head 24 downward and always hold the parts in proper relation while at the same time permitting the rocking and also the transversely sliding movement provided for by the rocking and transversely slidable bearing or support between the upper side of the ledge and the bracket 20.

While in the foregoing description I have referred to the casing supported by my improved supporting mechanism as a transmission gearing casing my invention is equally applicable for use in supporting any casing or equivalent part of the vehicle which requires to be supported from the frame thereof, and again, while I have described the supporting bracket 20 of my invention and the parts with which it cooperates as located at the forward end of the transmission casing it will be appreciated that the position of the parts may be reversed, and that the forward end thereof may be fixedly supported on the frame member while the rear end is supported through a rocking and transversely slidable bearing having the features of construction hereinbefore set forth.

Having thus described and explained my invention, I claim and desire to secure by Letters Patent:

1. In combination with a motor vehicle frame having two longitudinally extending side frame members spaced apart from one another, and two transverse supporting members spaced apart from one another and the ends of which are secured to said frame members; a transmission gearing casing one end of which is fixedly supported from one of said members; an upwardly extending supporting bracket fixedly secured to the other end of said casing and the upper end of which is offset and lies above a ledge provided upon the other of said supporting members, and which offset upper end is provided with a concave seat in its under side; a bearing member having a convex upper side adapted to lie within the concave seat aforesaid, and a flat under side adapted to rest upon the ledge aforesaid; two bolts arranged one upon each side of said bearing member and extending through holes in said offset upper end and in said ledge; and two springs one surrounding each of said bolts, and which springs act between abutments upon said bolts and the under side of said ledge to thereby force said offset upper end into engagement with said bearing member.

2. In combination with a motor vehicle frame having two longitudinally extending side frame members spaced apart from one another, and two transverse supporting members spaced apart from one another and the ends of which are secured to said frame members; a transmission gearing casing one end of which is fixedly supported from one of said members; an upwardly extending supporting bracket fixedly secured to the other end of said casing and the upper end of which is offset and lies above a ledge provided upon the other of said supporting members, and which offset upper end is provided with a concave seat in its under side; a bearing member having a convex upper side adapted to lie within the concave seat aforesaid, and a flat under side adapted to rest upon the ledge aforesaid; and spring mechanism acting upon the offset end of said bracket to force the same downward and against said bearing member.

3. In combination with a motor vehicle frame having two longitudinally extending side frame members spaced apart from one another, and two transverse supporting members spaced apart from one another and the ends of which are secured to said side frame members; a transmission gearing casing one end of which is fixedly supported from one of said supporting members; an upwardly extending supporting bracket fixedly secured to the other end of said casing and the upper end of which bracket is offset, and lies above a portion of the other of said supporting members; means for providing a rocking and a transversely slidable bearing between the under side of the offset upper end of said bracket and said second mentioned supporting member; and spring mechanism acting to force the offset portion aforesaid of said bracket downward and toward the portion of said supporting member above which it lies.

4. In combination with a motor vehicle frame having two longitudinally extending side frame members spaced apart from one another, and two transverse supporting members spaced apart from one another and the ends of which are secured to said side frame members; a transmission gearing casing one end of which is fixedly supported from one of said supporting members; an upwardly extending supporting bracket fixedly secured to the other end of said casing and the upper end of which bracket is offset, and lies above a portion of the other of said supporting members; means for providing a rocking and a transversely slidable bearing between the offset upper end of said bracket and said second mentioned supporting member; and yieldable holding means acting to force the offset portion aforesaid of said bracket toward the portion of said supporting member above which it lies.

5. In combination with a motor vehicle frame having two longitudinally extending side frame members spaced apart from one another, and two transverse supporting members spaced apart from one another and the ends of which are secured to said side frame members; a transmission gearing casing one end of which is fixedly supported from one of said supporting members; an upwardly extending supporting bracket fixedly secured to the other end of said casing; and means for providing a rocking and a transversely slidable bearing between the upper end of said bracket and the other of said supporting member and through which bearing the said other end of said casing is supported from the second mentioned of said supporting members.

6. In a motor vehicle, the combination with a frame structure having a substantially horizontal supporting ledge, of a casing one end of which is fixedly supported beneath and from said frame structure; an upwardly extending supporting bracket fixedly secured to the other end of said casing and the upper end of which is offset and lies above said ledge, and which offset upper end is provided with a concave seat in its under side; a bearing member having a convex upper portion adapted to lie within the concave seat aforesaid, and a flat underside which rests upon the ledge aforesaid when the parts are assembled; two bolts arranged one upon each side of said bearing member and extending through holes in said offset upper end in said ledge; and two springs one surrounding each of said bolts, and which springs act bteween abutments upon said bolts and the under side of said ledge to thereby force said offset upper end into engagement with said bearing member.

7. In a motor vehicle, the combination with a frame structure having a substantially horizontal supporting ledge, of a casing one end of which is fixedly supported beneath and from said frame structure; an upwardly extending supporting bracket fixedly secured to the other end of said casing and the upper end of which is offset and lies above said ledge, and which offset upper end is provided with a concave seat in its under side; a bearing member having a convex upper portion adapted to lie within the concave seat aforesaid, and a flat under side which rests upon the ledge aforesaid when the parts are assembled; and spring mechanism acting upon the offset end of said bracket to force the same downward and against said bearing member.

8. In a motor vehicle, the combination with a frame structure having a substantially horizontal supporting ledge, of a casing one end of which is fixedly supported beneath and from said frame structure; an upwardly extending supporting bracket fixedly secured to the other end of said casing and the upper end of which is offset and lies above said ledge; means for providing a rocking and a transversely slidable bearing between the under side of the offset upper end of said bracket and the upper surface of said ledge; and spring mechanism acting to force the offset portion aforesaid of said bracket downward and toward said ledge.

9. In a motor vehicle, the combination with a frame structure having a substantially horizontal supporting ledge, of a casing one end of which is fixedly supported beneath and from said frame structure; an upwardly extending supporting bracket fixedly secured to the other end of said casing; means for providing a rocking and a transveresly slidable bearing between the upper end of said bracket and the ledge aforesaid; and spring mechanism acting to force the upper end of said supporting bracket toward said ledge.

In testimony whereof I affix my signature.

FRANK A. WHITTEN.